United States Patent
Gao et al.

(10) Patent No.: US 10,757,662 B2
(45) Date of Patent: Aug. 25, 2020

(54) PILOT FREQUENCY TRANSMISSION METHOD FOR UPLINK SHARED CHANNEL, AND RELATED DEVICE

(71) Applicant: China Academy of Telecommunications Technology, Beijing (CN)

(72) Inventors: Xuejuan Gao, Beijing (CN); Songtao Liu, Beijing (CN); Xueming Pan, Beijing (CN)

(73) Assignee: China Academy of Telecommunications Technology, Beijing (CN)

( * ) Notice: Subject to any disclaimer, the term of this patent is extended or adjusted under 35 U.S.C. 154(b) by 0 days.

(21) Appl. No.: 16/301,437

(22) PCT Filed: May 12, 2017

(86) PCT No.: PCT/CN2017/084132
§ 371 (c)(1),
(2) Date: Nov. 13, 2018

(87) PCT Pub. No.: WO2017/193996
PCT Pub. Date: Nov. 16, 2017

(65) Prior Publication Data
US 2019/0306808 A1    Oct. 3, 2019

(30) Foreign Application Priority Data
May 13, 2016  (CN) .......................... 2016 1 0319785

(51) Int. Cl.
*H04W 52/32* (2009.01)
*H04L 5/00* (2006.01)
(Continued)

(52) U.S. Cl.
CPC ......... *H04W 52/325* (2013.01); *H04L 5/0051* (2013.01); *H04L 5/0082* (2013.01);
(Continued)

(58) Field of Classification Search
CPC ............... H04W 52/325; H04W 52/16; H04W 72/0473; H04W 80/08; H04W 88/02;
(Continued)

(56) References Cited

U.S. PATENT DOCUMENTS

2006/0203932 A1* 9/2006 Palanki ................ H04B 1/69
375/295
2008/0285526 A1* 11/2008 Gorokhov ............ H04B 1/7075
370/338
(Continued)

FOREIGN PATENT DOCUMENTS

| CN | 103037491 A | 4/2013 |
|---|---|---|
| CN | 103096448 A | 5/2013 |
| CN | 103166880 A | 6/2013 |
| WO | 2013067345 A1 | 5/2013 |
| WO | 2015042810 A1 | 4/2015 |

OTHER PUBLICATIONS

Ericsson, "Study of shorter TTI for latency reduction," 3GPP TSG-RAN WG2 #91bis, Oct. 4, 2015, 8 pgs., Malmö, Sweden.
(Continued)

*Primary Examiner* — Ian N Moore
*Assistant Examiner* — Latresa A McCallum
(74) *Attorney, Agent, or Firm* — Womble Bond Dickinson (US) LLP

(57) ABSTRACT

A method for transmitting pilots of an uplink shared channel comprises: determining, by a UE, transmit power of data carried in the uplink shared channel; determining, by the UE, transmit power of the pilots carried in the uplink shared channel according to the transmit power of the data carried in the uplink shared channel, and a pilot power boosting factor of the UE, wherein the pilot power boosting factor
(Continued)

represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern; and transmitting, by the UE, the pilots of the uplink shared channel at the transmit power of the pilots.

16 Claims, 8 Drawing Sheets

(51) Int. Cl.
  *H04L 27/26* (2006.01)
  *H04W 52/16* (2009.01)
  *H04W 72/04* (2009.01)
  *H04W 80/08* (2009.01)
  *H04W 88/02* (2009.01)
  *H04W 88/08* (2009.01)
  *H04W 52/14* (2009.01)
(52) U.S. Cl.
  CPC ....... *H04L 27/2613* (2013.01); *H04W 52/146* (2013.01); *H04W 52/16* (2013.01); *H04W 72/0473* (2013.01); *H04W 80/08* (2013.01); *H04W 88/02* (2013.01); *H04W 88/08* (2013.01)
(58) Field of Classification Search
  CPC .... H04W 88/08; H04L 5/0051; H04L 5/0082; H04L 27/2613
  See application file for complete search history.

(56) References Cited

U.S. PATENT DOCUMENTS

| | | | | |
|---|---|---|---|---|
| 2010/0142455 | A1* | 6/2010 | Imamura | H04W 52/146 |
| | | | | 370/329 |
| 2011/0128909 | A1* | 6/2011 | Luo | H04L 5/0023 |
| | | | | 370/328 |
| 2012/0188988 | A1* | 7/2012 | Chung | H04J 13/00 |
| | | | | 370/335 |
| 2013/0324180 | A1* | 12/2013 | Zhang | H04W 52/24 |
| | | | | 455/522 |
| 2014/0211301 | A1* | 7/2014 | Starodoumov | H01S 3/0941 |
| | | | | 359/341.5 |
| 2014/0248920 | A1* | 9/2014 | Venkatachari | H04W 52/18 |
| | | | | 455/522 |
| 2014/0254421 | A1* | 9/2014 | Ahlander | H04L 25/0224 |
| | | | | 370/252 |
| 2016/0006548 | A1 | 1/2016 | Yang et al. | |

OTHER PUBLICATIONS

Extended European Search Report for European Application No. 17795614.1, dated Mar. 26, 2019.
"3rd Generation Partnership Project; Technical Specification Group Radio Access Network; Evolved Universal Terrestrial Radio Access (E-ULTRA); Physical channels and modulation (Release 13)," 3GPP TS 36.211, Mar. 29, 2016, 155 pgs., V13. 1.0, France.
KDDI, "Views on UL Simultaneous Transmissions in Multiple TA," 3GPP TSG RAN WG1 Meeting #68, Feb. 6-10, 2012, 3 pages, R1-120672, Dresden, Germany.
The Japanese Office Action for Application No. 2018-560020 dated Jan. 28, 2020, 3 pages.

\* cited by examiner

PILOT FREQUENCY TRANSMISSION METHOD FOR UPLINK SHARED CHANNEL, AND RELATED DEVICE

CROSS-REFERENCE TO RELATED APPLICATIONS

This application is a U.S. National Stage of International Application No. PCT/CN2017/084132, filed May 12, 2017, which claims the benefit of Chinese Patent Application No. 201610319785.8, filed with the Chinese Patent Office on May 13, 2016, and entitled "method and device for transmitting pilots of an uplink shared channel", which was incorporated by reference in its entirety.

FIELD

The present invention relates to the field of communications, and particularly to a method and device for transmitting a pilot of an uplink shared channel.

BACKGROUND

I. The Existing Long Term Evolution (LTE) Frame Structures (in the Rel-8/9/10/11/12/13)

The Frame Structure Type 1 (FS1) is applicable to the existing LTE Frequency Division Duplex (FDD) system. In the FDD system, there are different carrier frequencies in, and the same frame structure for, uplink and downlink transmission. FIG. 1 illustrates a schematic structural diagram of the FS1, where a radio frame with the length of 10 ms over each carrier includes ten 1 ms sub-frames, and each sub-frame includes two slots with the length of 0.5 ms. A Transmission Time Interval (TTI) for transmitting uplink and downlink data is 1 ms.

The Frame Structure Type 2 (FS2) is applicable to the existing LTE Time Division Duplex (TDD) system. In the TDD system, there are different sub-frames or slots, at the same frequency, for uplink and downlink transmission. FIG. 2 illustrates a schematic structural diagram of the FS2. In the FS2, each radio frame with the length of 10 ms includes two half-frames with the length of 5 ms, and each half-frame includes five sub-frames with the length of 1 ms. The sub-frames in the FS2 are categorized into downlink sub-frames, uplink sub-frames, and special sub-frames, where each special sub-frame includes three components of a Downlink Pilot Time Slot (DwPTS), a Guard Period (GP), and an Uplink Pilot Time Slot (UpPTS), where a downlink pilot, downlink traffic data, and downlink control signaling can be transmitted in the DwPTS; no signal is transmitted in the GP; and only a random access signal and a Sounding Reference Symbol (SRS) can be transmitted, but neither uplink traffic data nor uplink control information can be transmitted, in the UpPTS. Each half-frame includes at least one downlink sub-frame, at least one uplink sub-frame, and at most one special sub-frame. Table 1 depicts seven uplink-downlink sub-frame configurations supported in the FS2.

TABLE 1

| Uplink-downlink config-uration | Downlink-to-Uplink Switch-point periodicity | Uplink-downlink configurations Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

II. The DMRS Design of a PUSCH in the Existing LTE System

FIG. 3a and FIG. 3b illustrate structural diagrams of data and pilots (i.e., reference signals, or Demodulation Reference Signals (DMRS's) for demodulating the data), of an LTE Physical Uplink Shared Channel (PUSCH) in a sub-frame. As illustrated in FIG. 3a, with a normal Cyclic Prefix (CP), the pilots are transmitted in the fourth symbol in each slot of each sub-frame, and the data are transmitted in the other symbols than the fourth symbol. As illustrated in FIG. 3b, with an extended CP, the pilots are transmitted in the third symbol in each slot of each sub-frame, and the data are transmitted in the other symbols than the third symbol. An uplink pilot is a UE-specific pilot generated according to the size of a real bandwidth scheduled by the PUSCH. Transmit power of a DMRS is the same as transmit power of data. In order to support the uplink Multi User-Multi Input Multi Output (MU-MIMO) mode, the same pilot-based sequence can be shifted cyclically using each column of pilots to orthogonally transmit pilots of a plurality of UEs sharing the same resource, so that a receiver can distinguish pilot information of the different UEs from each other by shifting the pilot information cyclically.

As there is a changing demand for mobile communication traffic, the traffic is required to be more and more real-time. One of working solutions to shortening a delay is to reduce the length of a TTI.

In the LTE system, the existing channel transmission is generally defined in a sub-frame, and when a PUSCH is transmitted in a shorter TTI than 1 ms, the DMRS structure designed for a 1 ms sub-frame in the LTE system can be reused, and DMRS's of short data transmission in a sub-frame can be transmitted at the same time position, where the short data transmission is defined as data transmission with a smaller length of time than 1 ms. However there is separate scheduling information of a plurality of PUSCHs, and scheduled bandwidths of the respective scheduling information may only overlap partially with each other; and in order to enable the DMRS's of the different short data transmission to be distinguished from each other in the same symbol, pilot sequences of the respective short data transmission can be transmitted in the same resource region in a frequency division multiplexing mode with a comb-like pattern so that uplink data can be transmitted and demodulated correctly. In this way, a plurality of UEs can share the DMRS resources, but there has been absent a definite solution to determining transmit power of a DMRS.

SUMMARY

Embodiments of the invention provide a method and device for transmitting a pilot of an uplink shared channel so as to determine transmit power of a pilot when pilot sequences of respective short data transmission are transmitted in the same resource region in a frequency division multiplexing mode with a comb-like pattern.

Particular technical solutions according to embodiments of the invention are as follows.

In a first aspect, an embodiment of the invention provides a method for transmitting pilots of an uplink shared channel.

A UE determines transmit power of data carried in an uplink shared channel.

The UE determines transmit power of the pilots carried in the uplink shared channel according to the transmit power of the data carried in the uplink shared channel, and a pilot power boosting factor of the UE. The pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

The UE transmits the pilots of the uplink shared channel at the transmit power of the pilots.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping intervals or frequency mapping densities at which the pilots are transmitted with the comb-like pattern, or respective numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

In a second aspect, an embodiment of the invention provides a method for transmitting pilots of an uplink shared channel.

A base station determines transmit power at which a UE transmits data carried in an uplink shared channel.

The base station determines transmit power at which the UE transmits the pilots of the uplink shared channel according to the transmit power of the data carried in the uplink shared channel of the UE, and a pilot power boosting factor of the UE. The pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

In a third aspect, an embodiment of the invention provides a UE. The UE includes a first processing module, a second processing module and a transmitting module.

The first processing module is configured to determine transmit power of data carried in an uplink shared channel.

The second processing module is configured to determine transmit power of pilots carried in the uplink shared channel according to the transmit power of the data carried in the uplink shared channel, and a pilot power boosting factor of the UE. The pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

The transmitting module is configured to transmit the pilots of the uplink shared channel at the transmit power of the pilots.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

In a fourth aspect, an embodiment of the invention provides a base station. The base station includes a first processing module and a second processing module.

The first processing module is configured to determine transmit power at which a UE transmits data carried in an uplink shared channel.

The second processing module is configured to determine transmit power at which the UE transmits pilots of the uplink shared channel according to the transmit power of the data carried in the uplink shared channel of the UE, and a pilot power boosting factor of the UE. The pilot power boosting factor represents a multiple of transmit power of the pilots of the uplink shared channel in a resource element relative to transmit power of the data of the uplink shared channel in a resource element, the multiple is more than or equal to 1, and the pilots are transmitted in a symbol occupied by the pilots with a comb-like pattern.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping interval or frequency mapping densities at which the pilots are transmitted with the comb-like pattern, or numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

In a fifth aspect, an embodiment of the invention provides a UE. The UE includes a processor, a memory, and a transceiver. The transceiver is configured to transmit and receive data under the control of the processor. Preset program is stored in the memory. The processor is configured to read the program in the memory, and to execute the program.

The program is executed to determine transmit power of data carried in an uplink shared channel.

The program is executed to determine transmit power of pilots carried in the uplink shared channel according to the transmit power of the data carried in the uplink shared channel, and a pilot power boosting factor of the UE. The pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

The program is executed to transmit the pilots of the uplink shared channel at the transmit power of the pilots.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping interval or respective frequency mapping densities at which the pilots are transmitted with the comb-like pattern, or respective numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

In a sixth aspect, an embodiment of the invention provides a base station. The base station includes a processor, a memory, and a transceiver. The transceiver is configured to transmit and receive data under the control of the processor. Preset program is stored in the memory. The processor is configured to read the program in the memory, and to execute the program.

The program is executed to determine transmit power at which a UE transmits data carried in an uplink shared channel.

The program is executed to determine transmit power at which the UE transmits pilots of the uplink shared channel according to the transmit power of the data carried in the uplink shared channel of the UE, and a pilot power boosting factor of the UE. The pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

In a possible implementation, the sum of transmit power of the pilots of the uplink shared channel in resource elements for transmitting the pilots in the symbol occupied by the pilots is no more than the transmit power of the data of the uplink shared channel.

In a possible implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is configured by the network side to the UE via the higher-layer signaling.

One pilot power boosting factor is configured via the higher-layer signaling; or a plurality of pilot power boosting factors are configured via the higher-layer signaling, each pilot power boosting factor corresponds to a frequency mapping interval or a frequency mapping density at which the pilots are transmitted with the comb-like pattern, or the number of UEs for which multiplex pilots are in the same symbol with the comb-like pattern.

In a possible implementation, the pilot power boosting factor of the UE is predefined between the network side and the UE in the protocol.

One pilot power boosting factor is predefined, or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

In a possible implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In a possible implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

In a possible implementation, a Transmission Time Interval (TTI) of the uplink shared channel is less than 1 millisecond.

With the technical solutions above, in the embodiments of the invention, the UE determines the transmit power of the pilots carried in the uplink shared channel according to the transmit power of the data carried in the uplink shared channel, and the pilot power boosting factor of the UE. The pilot power boosting factor of the UE is defined as a multiple of transmit power of the pilots of the uplink shared channel in a resource element relative to transmit power of the data carried in the uplink shared channel in a resource element, and the multiple is defined to be more than or equal to 1, so that there is provided a solution to determine transmit power of pilots in the case that pilot sequences of respective short data transmission are transmitted in the same resource region in a frequency division multiplexing mode with a comb-like pattern, and the accuracy of channel estimation can be improved by boosting the transmit power of the pilots while lowering the transmission density of the pilots.

DETAILED DESCRIPTION OF THE EMBODIMENTS

Figure 1:
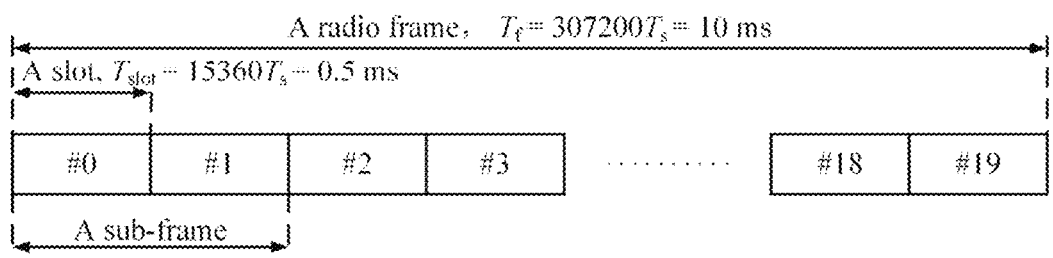
FIG. 1 is a schematic structural diagram of the FS1.
Figure 2:
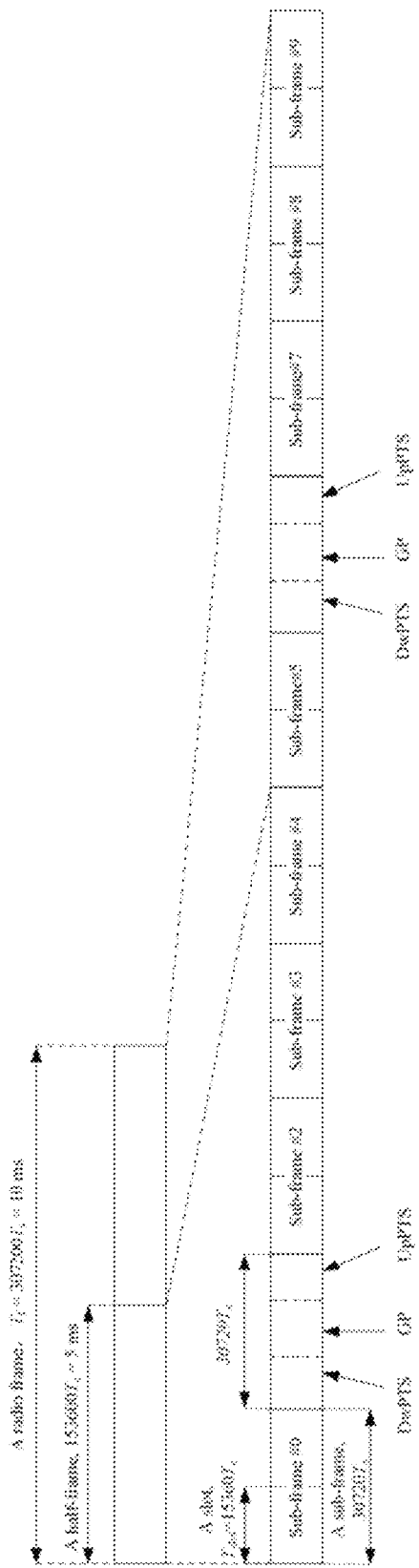
FIG. 2 is a schematic structural diagram of the FS2.
Figure 3A:
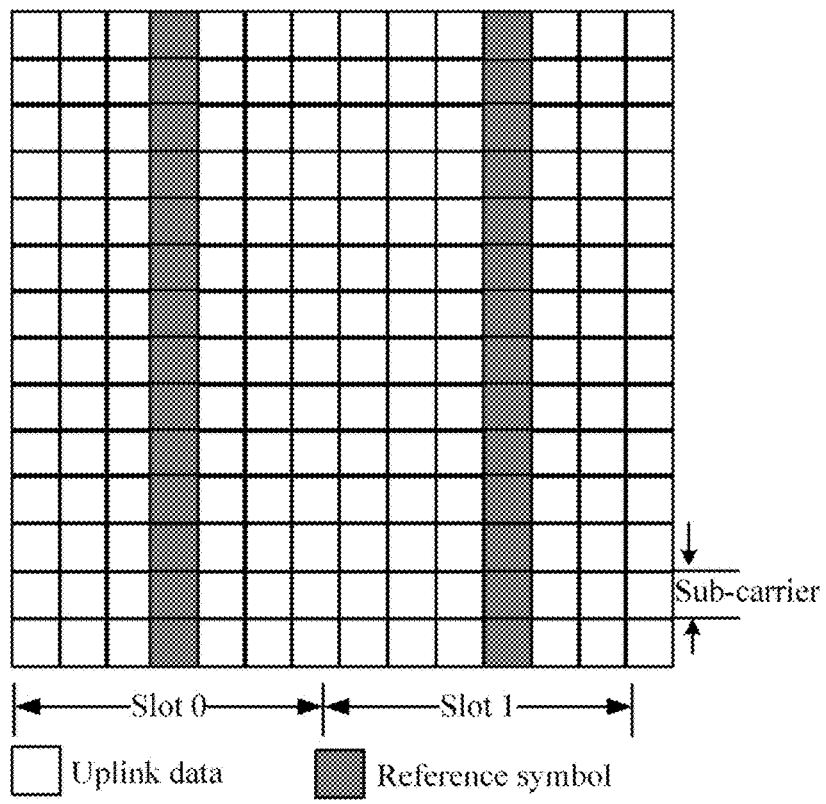
FIG. 3A is a schematic structural diagram of data and pilots of a PUSCH in a sub-frame with a normal CP.
Figure 3B:
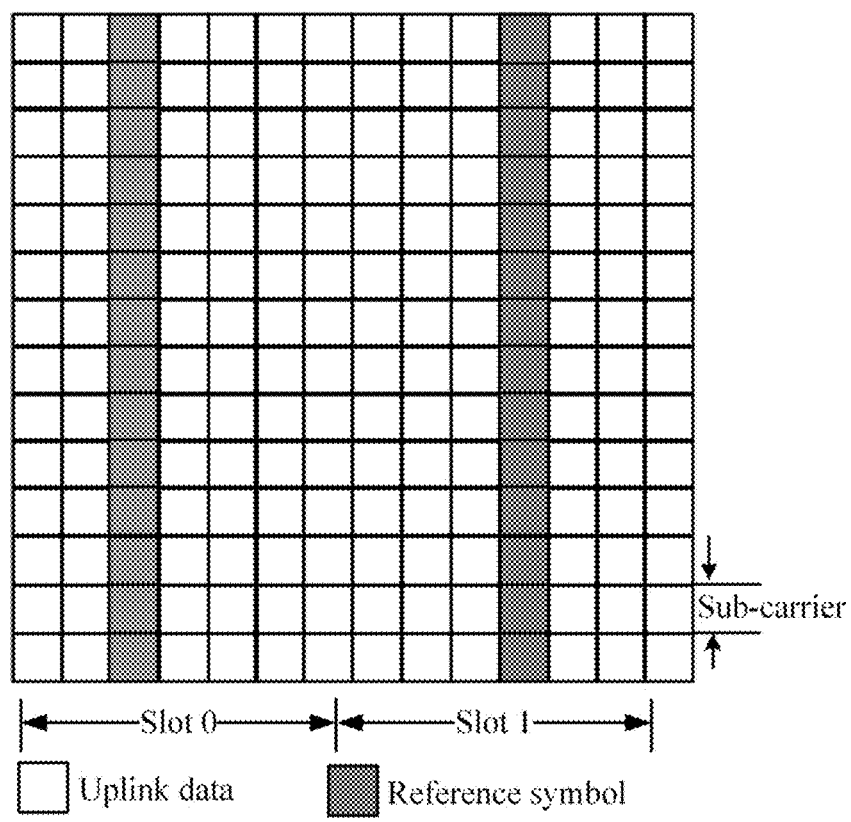
FIG. 3B is a schematic structural diagram of data and pilots of a PUSCH in a sub-frame with an extended CP.

In order to make the objects, technical solutions, and advantages of the embodiments of the invention more apparent, the technical solutions according to the embodiments of the invention will be described below clearly and fully with reference to the drawings in the embodiments of the invention, and apparently the embodiments described below are only a part but not all of the embodiments of the invention. Based upon the embodiments here of the invention, all the other embodiments which can occur to those ordinarily skilled in the art without any inventive effort shall fall into the scope of the invention.

It shall be appreciated that the technical solutions according to the invention can be applicable to various communication systems, e.g., a Global System of Mobile communication (GSM) system, a Code Division Multiple Access (CDMA) system, a Wideband Code Division Multiple Access (WCDMA) system, a General Packet Radio Service (GPRS) system, a Long Term Evolution (LTE) system, an Advanced Long Term Evolution (LTE-A) system, a Universal Mobile Telecommunication System (UMTS) system, etc.

It shall be further appreciated in the embodiments of the invention, a User Equipment (UE) includes but will not be limited to a Mobile Station (MS), a mobile terminal, a mobile telephone, a handset, a portable equipment, etc., and the user equipment can communicate with one or more core networks over a Radio Access Network (RAN). For example, the user equipment can be a mobile phone (referred to as a "cellular" phone), a computer with a function of radio communication, etc., and the user equipment can also be a portable, pocket, handheld, built-in-computer, or on-vehicle mobile device.

In the embodiments of the invention, a base station (e.g., an access point) can be such a device in an access network that communicates with a radio terminal over one or more sectors via an air interface. The base station can be configured to convert a received air frame into an IP packet, and a received IP packet into an air frame, and operate as a router between the radio terminal, and the remaining components of the access network, where the remaining components of the access network can include an Internet Protocol (IP) network. The base station can further coordinate attribute management on the air interface, and for example, the base station can be a Base Communication module Station (BTS) in a GSM or CDMA system, or can be a base station (Node B) in a WCDMA system, or can be an evolved base station (Node B or eNB or e-Node B) in an LTE system, although the invention will not be limited thereto.

In order to make the objects, technical solutions, and advantages of the embodiments of the invention more apparent, the invention will be described below in further details with reference to the drawings, and apparently the embodiments to be described are only a part but not all of the embodiments of the invention. Based upon the embodiments here of the invention, all the other embodiments which can occur to those ordinarily skilled in the art without any inventive effort shall fall into the scope of the invention.

At present, if DMRS's of short data transmission, and particularly short data transmission with a smaller length than 0.5 ms are transmitted in only a column of pilot positions in a sub-frame, then the density of the DMRS's of short data transmission in the time domain will be lower than that of 1 ms data transmission, so the performance of interpolation in the time domain may be affected, and also the interference robustness may be degraded as compared with DMRS's transmitted in two columns, so that the performance of channel estimation for the short data transmission may be degraded.

The inventors have identified that when DMRS's are transmitted with a comb-like pattern, DMRS's of short data transmission are transmitted over only a part of frequency resources in a Single Carrier-Frequency Division Multiple Access (SC-FDMA) symbol in which the DMRS's are transmitted, so as long as total transmit power of a DMRS SC-FDMA symbol of a UE does not exceed total transmit power of a data SC-FDMA symbol, transmit power of a DMRS may be boosted to some extent to thereby improve the performance of channel estimation and the interference robustness for the short data transmission. Embodiments of the invention propose a DMRS power boosting solution while the DMRS's are transmitted with a comb-like pattern, to thereby improve the performance of channel estimation.

In the embodiments of the invention, the comb-like pattern refers to that pilots are transmitted according to a start frequency position, and a frequency mapping interval or a frequency mapping density or a pilot reusage factor.

Hereupon a core idea of the invention lies in that when DMRS's are transmitted with a comb-like pattern, DMRS's of a UE are transmitted in only a part of Resource Elements (REs) in an SC-FDMA symbol. Accordingly as long as total transmit power of a DMRS SC-FDMA symbol does not exceed total transmit power of a data SC-FDMA symbol, power of a DMRS in each RE may be boosted. Since the density of DMRS's is lowered, the performance of channel estimation can be improved due to the boosted power of the DMRS in each RE.

Figure 4:
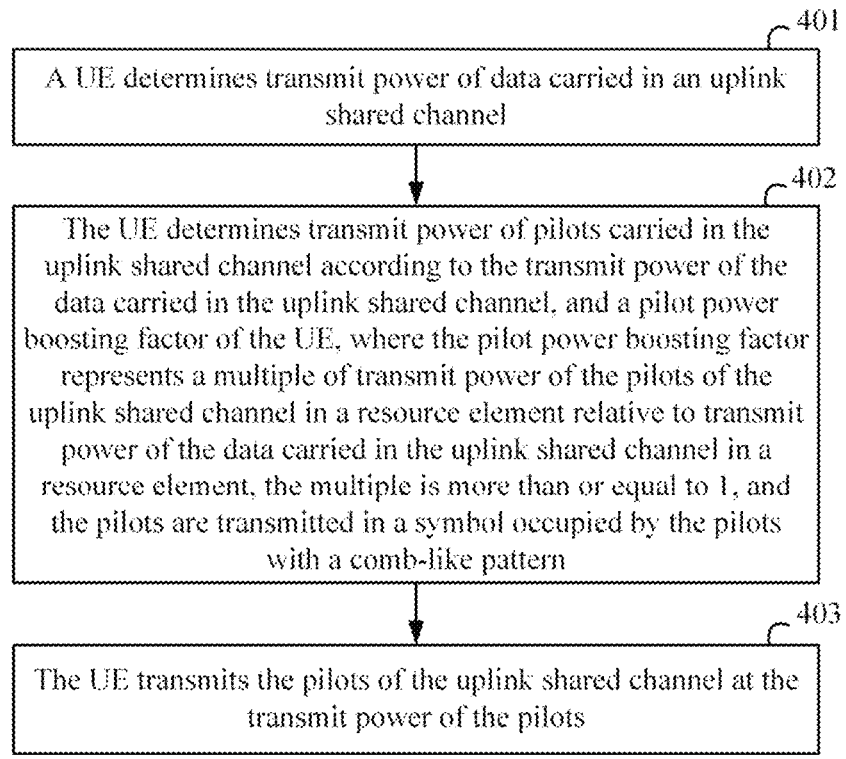
FIG. 4 is a schematic flow chart of a method for transmitting pilots of an uplink shared channel at the UE side according to an embodiment of the invention.

Hereupon in an embodiment of the invention, as illustrated in FIG. 4, a detailed flow of a method for transmitting pilots of an uplink shared channel at the UE side is as follows.

In the step 401, a UE determines transmit power of data carried in an uplink shared channel.

In the embodiment of the invention, a transmission time interval of the uplink shared channel is less than 1 millisecond.

Particularly the transmit power of the data carried in the uplink shared channel can be notified by a base station to the UE, or can be predefined between a base station and the UE in a protocol.

In the step 402, the UE determines transmit power of the pilots carried in the uplink shared channel according to the transmit power of the data carried in the uplink shared channel, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

In an implementation, the sum of the transmit power of the pilots of the uplink shared channel in resource elements for transmitting the pilots in the symbol occupied by the pilots is no more than the transmit power of the data of the uplink shared channel.

In an implementation, the pilot power boosting factor of the UE can be obtained in the following several implementations without any limitation thereto.

Firstly the pilot power boosting factor of the UE is configured by the network side to the UE via higher-layer signaling.

Particularly one pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

For example, K pilot power boosting factors are prescribed in a system, and represented as {n1, n2, . . . , nk}, the UE is notified of one of the K pilot power boosting factors via $\lceil \log_2 K \rceil$ bits of higher-layer signaling, and the UE calculates the transmit power of the pilot of the uplink shared channel in an RE from the transmit power of the data of the uplink shared channel in an RE according to the received pilot power boosting factor.

Here one of the prescribed K pilot power boosting factors represents no power boosting.

Secondly the pilot power boosting factor of the UE is predefined between the network side and the UE in a protocol.

In a particular implementation, the network side and the UE predefine one pilot power boosting factor in the protocol. In this implementation, one pilot power boosting factor is predefined, that is, the pilot power boosting factor is applicable in any case.

In another particular implementation, pilot power boosting factors each is predefined for respective frequency mapping intervals or respective frequency mapping densities at which the pilots are transmitted with the comb-like pattern, or respective numbers of UEs for which multiplex pilots are in the same symbol with the comb-like pattern.

For example, when the frequency mapping interval or the frequency mapping density at which the pilots are transmitted with the comb-like pattern, or the number of UEs for which multiplex pilots are in the same symbol with the comb-like pattern is 2, the pilot power boosting factor is n1. Preferably n1 is no more than 2 (linear power is boosted by a factor of 2, and the same will apply hereinafter) or 3 dB (power in dB is boosted by a factor of 3, and the same will apply hereinafter). When the frequency mapping interval or the frequency mapping density at which the pilots are transmitted with the comb-like pattern, or the number of UEs for which multiplex pilots are in the same symbol with the comb-like pattern is 3, the pilot power boosting factor is n2. Preferably n2 is no more than 3 or 4.77 dB. When the frequency mapping interval or the frequency mapping density at which the pilots are transmitted with the comb-like pattern, or the number of UEs for which multiplex pilots are in the same symbol with the comb-like pattern is 4, the pilot power boosting factor is n3. Preferably n3 is no more than 4 or 6 dB. When the frequency mapping interval or the frequency mapping density at which the pilots are transmitted with the comb-like pattern, or the number of UEs for which multiplex pilots are in the same symbol with the comb-like pattern is 6, the pilot power boosting factor is n4. Preferably n4 is no more than 6 or 7.78 dB.

Thirdly the UE determines the pilot power boosting factor according to a frequency mapping interval at which the pilots are transmitted with the comb-like pattern.

Fourthly the UE determines the pilot power boosting factor according to a frequency mapping density at which the pilots are transmitted with the comb-like pattern.

Fifthly the UE determines the pilot power boosting factor according to the number of UEs for which multiplex pilots are in the same symbol with the comb-like pattern.

For example, if the UE determines that the frequency mapping interval or the frequency mapping density at which the pilots are transmitted with the comb-like pattern, or the number of UEs for which multiplex pilots are in the same symbol with the comb-like pattern is 2, then the UE will determine the pilot power boosting factor as 2 or 3 dB. If the UE determines that the frequency mapping interval or the frequency mapping density at which the pilots are transmitted with the comb-like pattern, or the number of UEs for which multiplex pilots are in the same symbol with the comb-like pattern is 3, then the UE will determine the pilot power boosting factor as 3 or 4.77 dB. If the UE determines that the frequency mapping interval or the frequency mapping density at which the pilots are transmitted with the comb-like pattern, or the number of UEs for which multiplex pilots are in the same symbol with the comb-like pattern is 4, then the UE will determine the pilot power boosting factor as 4 or 6 dB. If the UE determines that the frequency mapping interval or the frequency mapping density at which the pilots are transmitted with the comb-like pattern, or the number of UEs for which multiplex pilots are in the same symbol with the comb-like pattern is 6, then the UE will determine the pilot power boosting factor as 6 or 7.78 dB.

In an implementation, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

Particularly the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

Particularly the number of UEs for which multiplex pilots are in the same symbol with the comb-like pattern can alternatively be represented as a pilot reusage factor, and the pilot reusage factor is defined as the number of different pilot sequences transmitted concurrently in the same symbol in a frequency division multiplexing mode.

In the step 403, the UE transmits the pilot of the uplink shared channel at the transmit power of the pilot.

Particularly the UE transmits the pilot of the uplink shared channel at the transmit power of the pilot of the uplink shared channel determined in the step 402.

Figure 5:
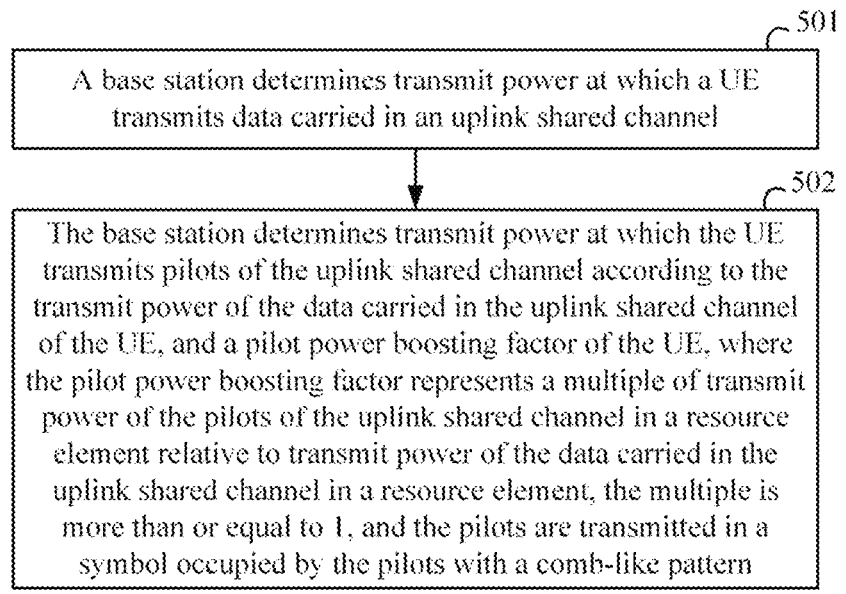
FIG. 5 is a schematic flow chart of a method for transmitting pilots of an uplink shared channel at the base station side according to an embodiment of the invention.

Based upon the same inventive idea, as illustrated in FIG. 5, a detailed flow of a method for transmitting pilots of an uplink shared channel at the base station side is as follows:

In the step 501, a base station determines transmit power at which a UE transmits data carried in an uplink shared channel.

Particularly a transmission time interval of the uplink shared channel is less than 1 millisecond.

In the step 502, the base station determines transmit power at which the UE transmits pilots of the uplink shared channel according to the transmit power of the data carried in the uplink shared channel of the UE, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

In an implementation, the sum of the transmit power of the pilots of the uplink shared channel in resource elements for transmitting the pilots in the symbol occupied by the pilots is no more than the transmit power of the data of the uplink shared channel.

In an implementation, the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

Particularly one pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

Particularly when the pilot power boosting factor of the UE is predefined between the network side and the UE in the protocol, one pilot power boosting factor can be predefined; or pilot power boosting factors each can be predefined for respective frequency mapping intervals or frequency mapping densities at which the pilots are transmitted with the comb-like pattern, or the numbers of UEs for which multiplex pilots are in the same symbol with the comb-like pattern.

In an implementation, in the case that there are a plurality of pilot power boosting factors, the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

In an implementation, the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

A process of transmitting pilots of an uplink shared channel will be described below in details in a particular embodiment thereof.

Figure 6:
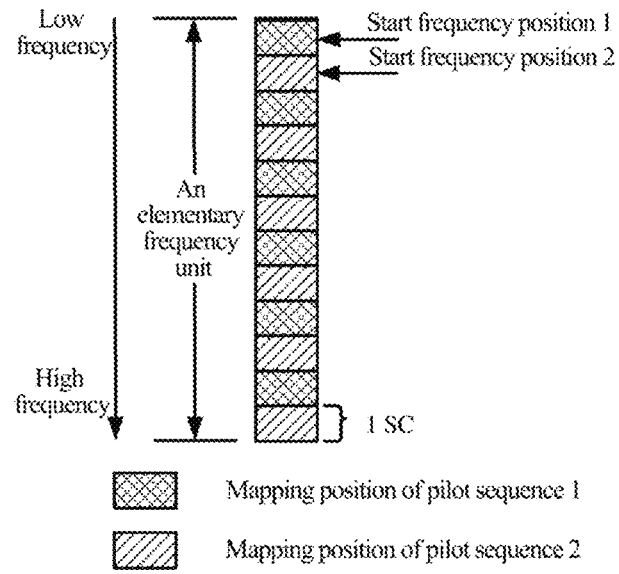
FIG. 6 is a schematic diagram of a comb-like mapping pattern when a frequency mapping interval, or a frequency mapping density, or the number of UEs for which multiplex pilots are in the same symbol with a comb-like pattern is 2 according to an embodiment of the invention.
Figure 7:
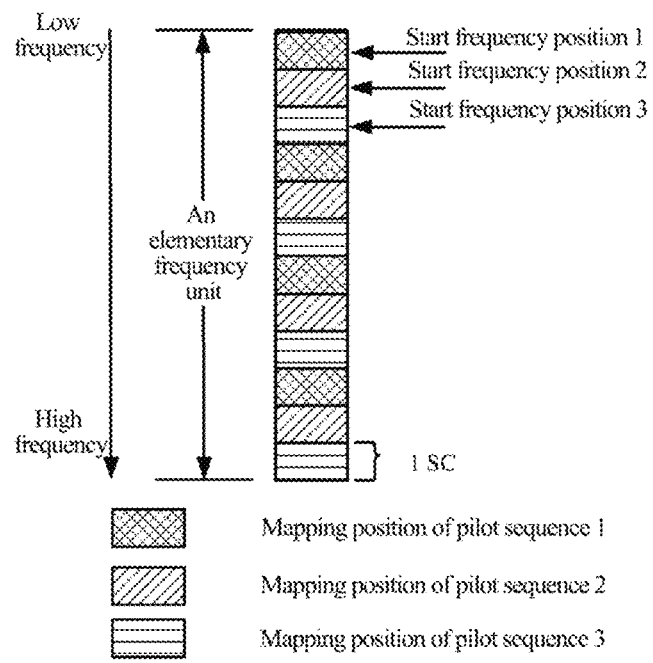
FIG. 7 is a schematic diagram of a comb-like mapping pattern when a frequency mapping interval, or a frequency mapping density, or the number of UEs for which multiplex pilots are in the same symbol with a comb-like pattern is 3 according to an embodiment of the invention.
Figure 8:
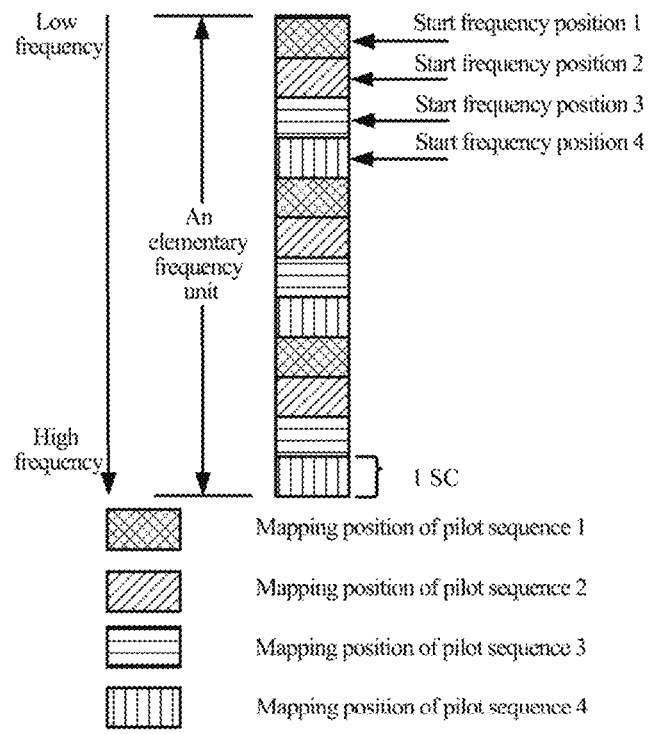
FIG. 8 is a schematic diagram of a comb-like mapping pattern when a frequency mapping interval, or a frequency mapping density, or the number of UEs for which multiplex pilots are in the same symbol with a comb-like pattern is 4 according to an embodiment of the invention.
Figure 9:
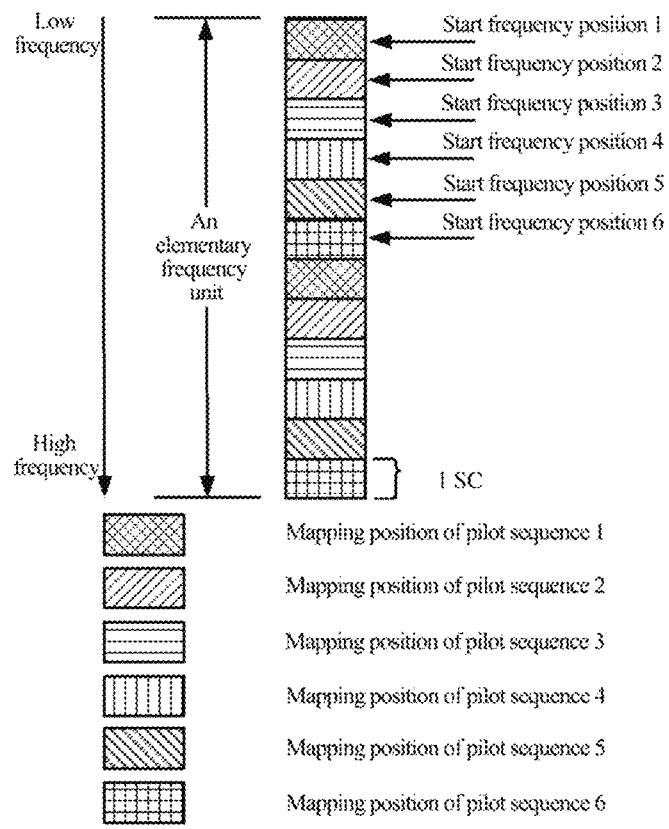
FIG. 9 is a schematic diagram of a comb-like mapping pattern when a frequency mapping interval, or a frequency mapping density, or the number of UEs for which multiplex pilots are in the same symbol with a comb-like pattern is 6 according to an embodiment of the invention.

In this particular embodiment, FIG. 6 to FIG. 8 illustrates comb-like mapping patterns respectively when the frequency mapping interval or the frequency mapping density, or the number of UEs for which multiplex pilots are in the same symbol with the comb-like pattern is 2, 3, 4, and 6 respectively, where the pilots are mapped in an elementary frequency unit, for example, but the same mapping pattern will apply to each of a plurality of elementary frequency units; and for example, an elementary frequency unit includes 12 consecutive sub-carriers in the frequency domain, but the same description will apply to the other sizes of an elementary frequency unit, and the other pilot mapping patterns.

Power of the pilots of the uplink shared channel can be boosted as follows in some particular embodiments.

Firstly the pilot power boosting factor is configured via higher-layer signaling.

For example, the frequency mapping interval or the frequency mapping density of the pilots, or the number of UEs for which multiplex pilots are in the same symbol with the comb-like pattern, in the system is prescribed as 4, there are three DMRS REs of a UE in an elementary frequency unit, and the highest total power of a pilot SC-FDMA symbol is the same as power of a data SC-FDMA symbol, so power of the pilot in an SC-FDMA symbol can be boosted by at most 6 dB. A set of pilot power boosting factors n is defined as {0 dB, 3 dB, 4.77 dB, 6 dB}, that is, there are four elements in the set, i.e., K=4, so the UE shall be notified of one of the four pilot power boosting factors via two bits of higher-layer signaling, where the pilot power boosting factor 0 corresponds to no power boosting, and the pilot power boosting factor 6 corresponds to the largest power boosting.

In an embodiment, power of PUSCH data transmitted in an RE is defined as $E_{Data\_RE}$. The UE calculates transmit power of a DMRS transmitted in an RE as $E_{DMRS\_RE}=10^{n/10} \cdot E_{Data\_RE}$ according to the pilot power boosting factor n notified via the received higher-layer signaling.

Of course the pilot power boosting factor can alternatively be defined directly as a multiple of transmit power of a DMRS transmitted in an RE relative to transmit power of data transmitted in an RE, and for example, a set of pilot power boosting factors n can be defined as {1, 2, 3, 4}, and the UE can be notified of one of the four pilot power boosting factors via two bits of higher-layer signaling, where 1 corresponds to no power boosting, and 4 represents that transmit power of a DMRS transmitting in an RE is four times transmit power of data transmitted in an RE; and the UE can calculate transmit power of a DMRS transmitted in an RE as $E_{DMRS\_RE}=n \cdot E_{Data\_RE}$ according to the pilot power boosting factor n notified via the received higher-layer signaling.

Secondly the pilot power boosting factor is predefined.

For example, the frequency mapping interval or the frequency mapping density of the pilots, or the number of UEs for which multiplex pilots are in the same symbol with the comb-like pattern, in the system is prescribed as 4, there are three DMRS REs of a UE in an elementary frequency unit, and the highest total power of a pilot SC-FDMA symbol is the same as power of a data SC-FDMA symbol, so power of the pilot in the SC-FDMA symbol can be boosted by at most 6 dB.

In an embodiment, pilot power boosting factors corresponding respectively to different frequency mapping intervals are predefined, and power of PUSCH data transmitted in an RE is defined as $E_{Data\_RE}$. The UE calculates transmit power of a DMRS transmitted in an RE as $E_{DMRS\_RE}=10^{n/10} \cdot E_{Data\_RE}$ according to the predefined pilot power boosting factor n corresponding to the frequency mapping interval.

Alternatively a uniform pilot power boosting factor is predefined for all of the frequency mapping intervals or the frequency mapping densities of the pilots, or the numbers of UEs for which multiplex pilots are in the same symbol with the comb-like pattern. When the lowest frequency mapping interval or frequency mapping density of the pilots, or the lowest number of UEs for which multiplex pilots are in the same symbol with the comb-like pattern is 2, if the highest total power of a pilot SC-FDMA symbol is the same as power of a data SC-FDMA symbol, then power of the pilot in the SC-FDMA symbol may be boosted by at most 6 dB; and if a pilot power boosting factor n no more than 3 dB is defined, then transmit power of a DMRS RE will be $E_{DMRS\_RE}=10^{n/10} \cdot E_{Data\_RE}$.

Of course the pilot power boosting factor can alternatively be defined directly as a multiple of transmit power of a DMRS in an RE relative to transmit power of data in an RE, and for example, a pilot power boosting factor n can be defined, and transmit power of a DMRS in an RE can be calculated as $E_{DMRS\_RE}=n \cdot E_{Data\_RE}$.

Thirdly the pilot power boosting factor is determined according to the frequency mapping interval or the frequency mapping density of the pilots, or the pilot reusage factor.

In an embodiment, the pilot power boosting factor is the number of UEs for which multiplex pilots are in the same symbol with the comb-like pattern.

If the frequency mapping interval or the frequency mapping density of the pilots, or the number of UEs for which multiplex pilots are in the same symbol with the comb-like pattern in the system is prescribed as M, then there will be 12/M REs for transmitting an DMRS in an elementary frequency unit. Power of the pilot in an SC-FDMA RE can be boosted by at most $10 \log_{10} M$ dB, and Table 2 can be created according to the largest available power boosting, where Table 2 depicts a mapping relationship between the frequency mapping interval or the frequency mapping density of the pilots, or the number of UEs for which multiplex pilots are in the same symbol with the comb-like pattern, and the pilot power boosting factor.

TABLE 2

| Frequency mapping interval or frequency mapping density or pilot reusage factor | 2 | 3 | 4 | 6 |
|---|---|---|---|---|
| Pilot power boosting factor n (dB) | 3 | 4.77 | 6 | 7.78 |

In an embodiment, power of PUSCH data transmitted in an RE is defined as $E_{Data\_RE}$, and the UE calculates the pilot power boosting factor n according to the frequency mapping interval or the frequency mapping density, or the number of UEs for which multiplex pilots are in the same symbol with the comb-like pattern, notified via the received higher-layer signaling, so transmit power of a DMRS in an RE can be represented as $E_{DMRS\_RE}=10^{n/10} \cdot E_{Data\_RE}$.

Of course, the pilot power boosting factor can alternatively be defined directly as a multiple of transmit power of a DMRS in an RE relative to transmit power of data in an RE, and for example, Table 3 depicts a mapping relationship between the frequency mapping interval or the frequency mapping density of the pilots, or the number of UEs for which multiplex pilots are in the same symbol with the comb-like pattern, and the pilot power boosting factor, so transmit power of a DMRS in an RE can be represented as $E_{DMRS\_RE}=n \cdot E_{Data\_RE}$.

TABLE 3

| Frequency mapping interval or frequency mapping density or pilot reusage factor | 2 | 3 | 4 | 6 |
|---|---|---|---|---|

TABLE 3-continued

| Pilot power boosting factor n (multiply) | 2 | 3 | 4 | 6 |
|---|---|---|---|---|

Figure 10:
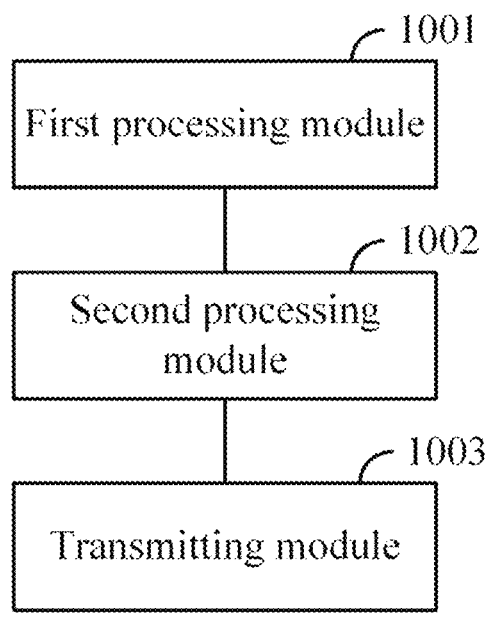
FIG. 10 is a schematic structural diagram of a UE according to an embodiment of the invention.

Based upon the same inventive idea, an embodiment of the invention provides a UE, and reference can be made to the related description of the method above according to the embodiment of the invention for an implementation of the UE, so a repeated description thereof will be omitted here. As illustrated in FIG. 10, the UE generally includes a first processing module 1001, a second processing module 1002 and a transmitting module 1003.

The first processing module 1001 is configured to determine transmit power of data carried in an uplink shared channel.

The second processing module 1002 is configured to determine transmit power of pilots carried in the uplink shared channel according to the transmit power of the data carried in the uplink shared channel, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

The transmitting module 1003 is configured to transmit the pilots of the uplink shared channel at the transmit power of the pilots.

Optionally the sum of the transmit power of the pilots of the uplink shared channel in resource elements for transmitting the pilots in the symbol occupied by the pilots is no more than the transmit power of the data of the uplink shared channel.

Optionally the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is configured by the network side to the UE via the higher-layer signaling:

One pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is predefined between the network side and the UE in the protocol:

One pilot power boosting factor is predefined, or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

Optionally the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

Optionally the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

Optionally a Transmission Time Interval (TTI) of the uplink shared channel is less than 1 millisecond.

Figure 11:
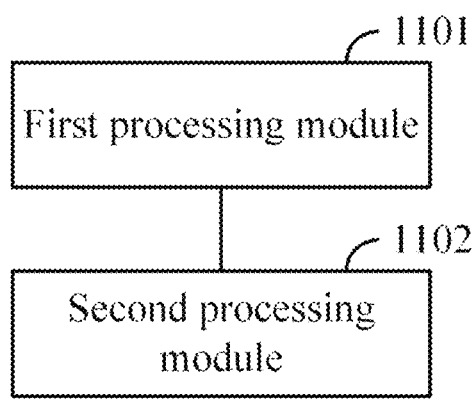
FIG. 11 is a schematic structural diagram of a base station according to an embodiment of the invention.

Based upon the same inventive idea, an embodiment of the invention provides a base station, and reference can be made to the related description of the method above according to the embodiment of the invention for an implementation of the base station, so a repeated description thereof will be omitted here. As illustrated in FIG. 11, the base station generally includes a first processing module 1101 and a second processing module 1102.

The first processing module 1101 is configured to determine transmit power at which a UE transmits data carried in an uplink shared channel.

The second processing module 1102 is configured to determine transmit power at which the UE transmits pilots of the uplink shared channel according to the transmit power of the data carried in the uplink shared channel of the UE, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

Optionally the sum of the transmit power of the pilots of the uplink shared channel in resource elements for transmitting the pilots in the symbol occupied by the pilots is no more than the transmit power of the data of the uplink shared channel.

Optionally the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is configured by the network side to the UE via the higher-layer signaling:

One pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is predefined between the network side and the UE in the protocol:

One pilot power boosting factor is predefined, or a plurality of pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

Optionally the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

Optionally the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

Optionally a Transmission Time Interval (TTI) of the uplink shared channel is less than 1 millisecond.

Figure 12:
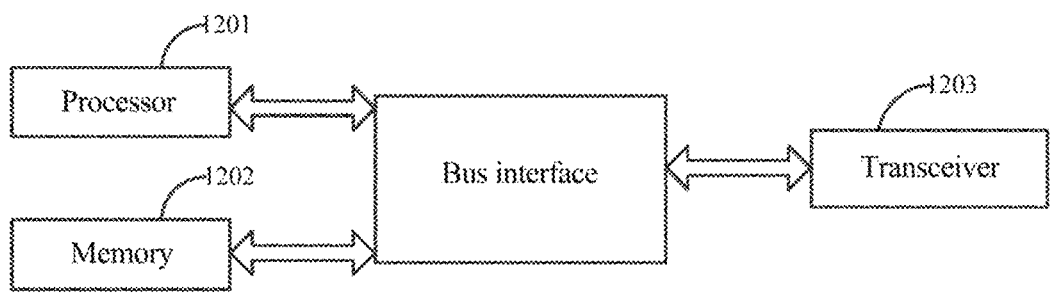
FIG. 12 is a schematic structural diagram of another UE according to an embodiment of the invention.

Based upon the same inventive idea, an embodiment of the invention further provides a UE, and reference can be made to the related description of the method above according to the embodiment of the invention for a particular implementation of the UE, so a repeated description thereof will be omitted here. As illustrated in FIG. 12, the UE generally includes a processor 1201, a memory 1202, and a transceiver 1203, where the transceiver 1203 is configured to transmit and receive data under the control of the processor 1201, preset program is stored in the memory 1202, and the processor 1201 is configured to read the program in the memory 1202, and to execute the program.

The program is executed to determine transmit power of data carried in an uplink shared channel.

The program is executed to determine transmit power of pilots carried in the uplink shared channel according to the transmit power of the data carried in the uplink shared channel, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

The program is executed to transmit the pilots of the uplink shared channel at the transmit power of the pilots through the transceiver 1203.

Optionally the sum of the transmit power of the pilots of the uplink shared channel in resource elements for transmitting the pilots in the symbol occupied by the pilots is no more than the transmit power of the data of the uplink shared channel.

Optionally the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is configured by the network side to the UE via the higher-layer signaling:

One pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is predefined between the network side and the UE in the protocol:

One pilot power boosting factor is predefined, or a plurality pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

Optionally the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

Optionally the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

Optionally a Transmission Time Interval (TTI) of the uplink shared channel is less than 1 millisecond.

Based upon the same inventive idea, an embodiment of the invention further provides a base station, and reference can be made to the related description of the method above according to the embodiment of the invention for a particular implementation of the base station, so a repeated description thereof will be omitted here. As illustrated in FIG. 11, the base station generally includes a processor 1301, a memory 1302, and a transceiver 1303, where the transceiver 1303 is configured to transmit and receive data under the control of the processor 1301, preset program is stored in the memory 1302, and the processor 1301 is configured to read the program in the memory 1302, and to execute the program.

The program is executed to determine transmit power at which a UE transmits data carried in an uplink shared channel.

The program is executed to determine transmit power at which the UE transmits pilots of the uplink shared channel according to the transmit power of the data carried in the uplink shared channel of the UE, and a pilot power boosting factor of the UE, where the pilot power boosting factor represents a multiple of transmit power of the pilots of the uplink shared channel in a resource element relative to transmit power of the data carried in the uplink shared channel in a resource element, the multiple is more than or equal to 1, and the pilots are transmitted in a symbol occupied by the pilots with a comb-like pattern.

Optionally the sum of the transmit power of the pilots of the uplink shared channel in resource elements for transmitting the pilots in the symbol occupied by the pilots is no more than the transmit power of the data of the uplink shared channel.

Optionally the pilot power boosting factor of the UE is configured by the network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is configured by the network side to the UE via the higher-layer signaling:

One pilot power boosting factor is configured via the higher-layer signaling; or a plurality of pilot power boosting factors are configured via the higher-layer signaling, where each pilot power boosting factor corresponds to a frequency mapping interval or a frequency mapping density at which the pilots are transmitted with the comb-like pattern, or the number of UEs for which multiplex pilots are in the same symbol with the comb-like pattern.

Optionally when the pilot power boosting factor of the UE is predefined between the network side and the UE in the protocol:

One pilot power boosting factor is predefined, or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern.

Optionally the largest value of the pilot power boosting factor is in proportion to the frequency mapping interval or the frequency mapping density at which the pilots are transmitted with the comb-like pattern, or the number of UEs for which multiplex pilots are in the same symbol with the comb-like pattern.

Optionally the frequency mapping interval or the frequency mapping density at which the pilots are transmitted with the comb-like pattern, or the number of UEs for which multiplex pilots are in the same symbol with the comb-like pattern is configured by the network side to the UE via higher-layer signaling, or predefined between the network side and the UE in a protocol.

Optionally a Transmission Time Interval (TTI) of the uplink shared channel is less than 1 millisecond.

Figure 13:
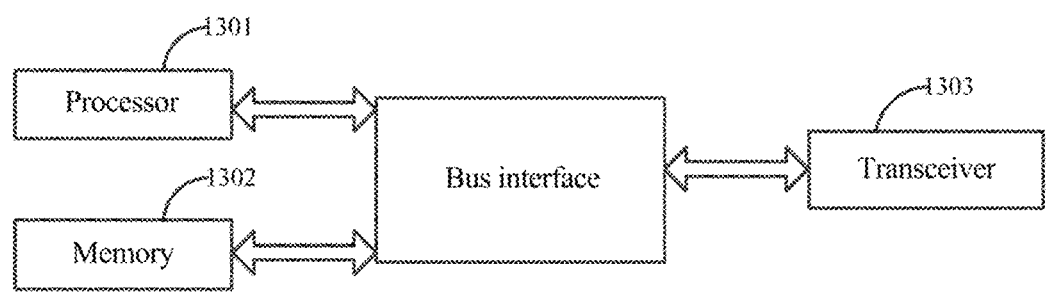
FIG. 13 is a schematic structural diagram of another base station according to an embodiment of the invention.

Here in FIG. 12 and FIG. 13, the processor, the memory, and the transceiver are connected with each other over a bus, and the bus architecture can include any number of interconnecting buses and bridges to particularly link together various circuits including one or more processors represented by the processor, and one or more memories represented by the memory. The bus architecture can further link together various other circuits, e.g., a peripheral device, a manostat, a power management circuit, etc., all of which are well known in the art, so a further description thereof will be omitted in this context. A bus interface serves as an interface. The transceiver can be an element, or a number of elements, e.g., a receiver and a transmitter, which are units for communication with various other devices over a transmission medium. The processor is responsible for managing the bus architecture and performing normal processes, and the memory can be configured to store data for use by the processor in performing the operations.

With the technical solutions above, in the embodiments of the invention, the UE determines the transmit power of the pilots carried in the uplink shared channel according to the transmit power of the data carried in the uplink shared channel, and the pilot power boosting factor of the UE, where the pilot power boosting factor of the UE is defined as a multiple of transmit power of the pilots of the uplink shared channel in a resource element relative to transmit power of the data carried in the uplink shared channel in a resource element, and the multiple is defined to be more than or equal to 1, so that there is provided a solution to determining transmit power of pilots in the case that pilot sequences of respective short data transmissions are transmitted in the same resource region in a frequency division multiplexing mode with a comb-like pattern, and the accuracy of channel estimation can be improved by boosting the transmit power of the pilots while lowering the transmission density of the pilots.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

What is claimed is:

1. A method for transmitting pilots of an uplink shared channel, the method comprising:
   determining, by a UE, transmit power of data carried in the uplink shared channel;

determining, by the UE, transmit power of the pilots carried in the uplink shared channel according to the transmit power of the data carried in the uplink shared channel, and a pilot power boosting factor, wherein the pilot power boosting factor represents how many times transmit power of a pilot in a resource element of the uplink shared channel is over transmit power of data in a resource element of the uplink shared channel, the pilot power boosting factor is more than or equal to 1, and the pilots are transmitted in a symbol occupied by the pilots with a comb-like pattern; and transmitting, by the UE, the pilots of the uplink shared channel at the transmit power of the pilots;

wherein the pilot power boosting factor is:

configured by a network side to the UE via higher-layer signaling; or predefined between the network side and the UE in a protocol; or determined according to a frequency mapping interval or a frequency mapping density at which the pilots are transmitted with the comb-like pattern, or the number of UEs for which multiplex pilots are in the same symbol with the comb-like pattern.

2. The method according to claim 1, wherein a sum of transmit power of the pilots of the uplink shared channel in resource elements for transmitting the pilots in the symbol occupied by the pilots is no more than the transmit power of the data of the uplink shared channel.

3. The method according to claim 1, wherein, when the pilot power boosting factor is configured by the network side to the UE via the higher-layer signaling:

one pilot power boosting factor is configured via the higher-layer signaling; or a plurality of pilot power boosting factors are configured via the higher-layer signaling, wherein each pilot power boosting factor corresponds to a frequency mapping interval or a frequency mapping density at which the pilots are transmitted with the comb-like pattern, or the number of UEs for which multiplex pilots are in the same symbol with the comb-like pattern;

or when the pilot power boosting factor is predefined between the network side and the UE in the protocol:

one pilot power boosting factor is predefined; or pilot power boosting factors each is defined for respective frequency mapping intervals or frequency mapping densities at which the pilots are transmitted with the comb-like pattern, or respective numbers of UEs for which multiplex pilots are in the same symbol with the comb-like pattern;

or when the pilot power boosting factor is determined according to the frequency mapping interval or the frequency mapping density, or the number of UEs:

the frequency mapping interval, or the frequency mapping density, or the number of UEs is:

configured by the network side to the UE via higher-layer signaling; or predefined between the network side and the UE in a protocol.

4. The method according to claim 1, wherein a Transmission Time Interval (TTI) of the uplink shared channel is less than 1 millisecond.

5. A method for transmitting pilots of an uplink shared channel, the method comprising:

determining, by a base station, transmit power at which a UE transmits data carried in the uplink shared channel; and determining, by the base station, transmit power at which the UE transmits the pilots of the uplink shared channel according to the transmit power at which the UE transmits the data carried in the uplink shared channel, and a pilot power boosting factor, wherein the pilot power boosting factor represents how many times transmit power of a pilot in a resource element of the uplink shared channel is over transmit power of data in a resource element of the uplink shared channel, the pilot power boosting factor is more than or equal to 1, and the pilots are transmitted in a symbol occupied by the pilots with a comb-like pattern, wherein the pilot power boosting factor is:

configured by a network side to the UE via higher-layer signaling; or predefined between the network side and the UE in a protocol; or determined according to a frequency mapping interval or a frequency mapping density at which the pilots are transmitted with the comb-like pattern, or the number of UEs for which multiplex pilots are in the same symbol with the comb-like pattern.

6. The method according to claim 5, wherein a sum of transmit power of the pilots of the uplink shared channel in resource elements for transmitting the pilots in the symbol occupied by the pilots is no more than the transmit power of the data of the uplink shared channel.

7. The method according to claim 5, wherein, when the pilot power boosting factor is configured by the network side to the UE via the higher-layer signaling:

one pilot power boosting factor is configured via the higher-layer signaling; or a plurality of pilot power boosting factors are configured via the higher-layer signaling, wherein each pilot power boosting factor corresponds to a frequency mapping interval or a frequency mapping density at which the pilots are transmitted with the comb-like pattern, or the number of UEs for which multiplex pilots are in the same symbol with the comb-like pattern;

or when the pilot power boosting factor is predefined between the network side and the UE in the protocol:

one pilot power boosting factor is predefined; or pilot power boosting factors each is predefined for respective frequency mapping intervals or frequency mapping densities at which the pilots are transmitted with the comb-like pattern, or numbers of UEs for which multiplex pilots are in the same symbol with the comb-like pattern;

or when the pilot power boosting factor is determined according to the frequency mapping interval or the frequency mapping density, or the number of UEs:

the frequency mapping interval, or the frequency mapping density, or the number of UEs is:

configured by the network side to the UE via higher-layer signaling; or predefined between the network side and the UE in a protocol.

8. The method according to claim 5, wherein a Transmission Time Interval (TTI) of the uplink shared channel is less than 1 millisecond.

9. A UE, comprising a memory and at least one processor, wherein the memory is configured to store readable program codes, and the at least one processor is configured to execute the readable program codes to:
  determine transmit power of data carried in an uplink shared channel;
  determine transmit power of pilots of the uplink shared channel according to the transmit power of the data carried in the uplink shared channel, and a pilot power boosting factor, wherein the pilot power boosting factor represents how many times transmit power of a pilot in a resource element of the uplink shared channel is over transmit power of data in a resource element of the uplink shared channel, the pilot power boosting factor is more than or equal to 1, and the pilots are transmitted in a symbol occupied by the pilots with a comb-like pattern; and
  transmit the pilots of the uplink shared channel at the transmit power of the pilots;
  wherein the pilot power boosting factor is configured by a network side to the UE via higher-layer signaling, or predefined between the network side and the UE in a protocol, or determined according to a frequency mapping interval or a frequency mapping density at which the pilots are transmitted with the comb-like pattern, or the number of UEs for which multiplex pilots are in the same symbol with the comb-like pattern.

10. The UE according to claim 9, wherein a sum of transmit power of the pilots of the uplink shared channel in resource elements for transmitting the pilots in the symbol occupied by the pilots is no more than the transmit power of the data of the uplink shared channel.

11. The UE according to claim 9, wherein,
  when the pilot power boosting factor is configured by the network side to the UE via the higher-layer signaling:
    one pilot power boosting factor is configured via the higher-layer signaling; or
    a plurality of pilot power boosting factors are configured via the higher-layer signaling, wherein each pilot power boosting factor corresponds to a frequency mapping interval or a frequency mapping density at which the pilots are transmitted with the comb-like pattern, or the number of UEs for which multiplex pilots are in the same symbol with the comb-like pattern;
  or
  when the pilot power boosting factor is predefined between the network side and the UE in the protocol:
    one pilot power boosting factor is predefined; or
    pilot power boosting factors each is predefined for respective frequency mapping intervals or frequency mapping densities at which the pilots are transmitted with the comb-like pattern, or respective numbers of UEs for which multiplex pilots are in the same symbol with the comb-like pattern;
  or
  when the pilot power boosting factor is determined according to the frequency mapping interval or the frequency mapping density, or the number of UEs:
    the frequency mapping interval, or the frequency mapping density, or the number of UEs is:
      configured by the network side to the UE via higher-layer signaling; or
      predefined between the network side and the UE in a protocol.

12. The UE according to claim 9, wherein a Transmission Time Interval (TTI) of the uplink shared channel is less than 1 millisecond.

13. A base station, comprising a memory and at least one processor, wherein the memory is configured to store readable program codes, and the at least one processor is configured to execute the readable program codes to:
  determine transmit power at which a UE transmits data carried in an uplink shared channel; and
  determine transmit power at which the UE transmits pilots of the uplink shared channel according to the transmit power of the data carried in the uplink shared channel of the UE, and a pilot power boosting factor, wherein the pilot power boosting factor represents how many times transmit power of a pilot in a resource element of the uplink shared channel is over transmit power of data in a resource element of the uplink shared channel, the pilot power boosting factor is more than or equal to 1, and the pilots are transmitted in a symbol occupied by the pilots with a comb-like pattern;
  wherein the pilot power boosting factor is:
  configured by a network side to the UE via higher-layer signaling; or
  predefined between the network side and the UE in a protocol, or
  determined according to a frequency mapping interval or a frequency mapping density at which the pilots are transmitted with the comb-like pattern, or the number of UEs for which multiplex pilots are in the same symbol with the comb-like pattern.

14. The base station according to claim 13, wherein a sum of transmit power of the pilots of the uplink shared channel in resource elements for transmitting the pilots in the symbol occupied by the pilots is no more than the transmit power of the data of the uplink shared channel.

15. The base station according to claim 13, wherein,
  when the pilot power boosting factor is configured by the network side to the UE via the higher-layer signaling:
    one pilot power boosting factor is configured via the higher-layer signaling; or
    a plurality of pilot power boosting factors are configured via the higher-layer signaling, wherein each pilot power boosting factor corresponds to a frequency mapping interval or a frequency mapping density at which the pilots are transmitted with the comb-like pattern, or the number of UEs for which multiplex pilots are in the same symbol with the comb-like pattern;
  or
  when the pilot power boosting factor is predefined between the network side and the UE in the protocol:
    one pilot power boosting factor is predefined; or
    pilot power boosting factors each is predefined for respective frequency mapping interval or frequency mapping densities at which the pilots are transmitted with the comb-like pattern, or respective numbers of UEs for which multiplex pilots are in the same symbol with the comb-like pattern;
  or
  when the pilot power boosting factor is determined according to the frequency mapping interval or the frequency mapping density, or the number of UEs:
    the frequency mapping interval, or the frequency mapping density, or the number of UEs is:
      configured by the network side to the UE via higher-layer signaling; or predefined between the network side and the UE in a protocol.

16. The base station according to claim 13, wherein a Transmission Time Interval (TTI) of the uplink shared channel is less than 1 millisecond.

* * * * *